United States Patent
Minakata

(10) Patent No.: US 9,436,897 B2
(45) Date of Patent: Sep. 6, 2016

(54) IMAGE FORMING APPARATUS CAPABLE OF SPEEDING UP DRAWING PROCESS, AN IMAGE FORMING METHOD, AND A NON-TRANSITORY COMPUTER-READABLE RECORDING MEDIUM

(71) Applicant: KYOCERA Document Solutions Inc., Osaka (JP)

(72) Inventor: Yoshinori Minakata, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/663,069

(22) Filed: Mar. 19, 2015

(65) Prior Publication Data

US 2015/0278654 A1    Oct. 1, 2015

(30) Foreign Application Priority Data

Mar. 28, 2014  (JP) ................. 2014-069018

(51) Int. Cl.
G06F 3/12 (2006.01)
G06K 15/02 (2006.01)
G06K 1/00 (2006.01)

(52) U.S. Cl.
CPC ....... *G06K 15/1856* (2013.01); *G06K 15/1852* (2013.01); *G06K 15/1861* (2013.01)

(58) Field of Classification Search
CPC .............. G06K 15/1856; G06K 15/1852; G06K 15/1806; G06K 15/181; G06K 15/1861
USPC ............. 358/1.1, 1.9, 1.13, 1.14, 1.15, 448
See application file for complete search history.

(56) References Cited

U.S. PATENT DOCUMENTS

2014/0293307 A1*  10/2014  Yamada ................ G06F 3/1215
                                                        358/1.13
2015/0015904 A1*   1/2015  Seko .................... G06F 3/121
                                                        358/1.11

FOREIGN PATENT DOCUMENTS

JP           2003-228477 A       8/2003

* cited by examiner

*Primary Examiner* — Gabriel Garcia
(74) *Attorney, Agent, or Firm* — McDonnell Boehnen Hulbert & Berghoff LLP

(57) ABSTRACT

An image forming apparatus includes a count unit, a count determination unit, a drawing process execution unit, and a count resetting unit. The count unit counts a drawing command for a vector object. The count determination unit determines whether or not a count of the drawing commands obtained by the count unit is equal to or larger than a threshold value. The drawing process execution unit executes, when the count determination unit determines that the count is equal to or larger than the threshold value all the drawing commands for the vector objects counted by the count unit prior to the count being equal to or larger than the threshold value. The count resetting unit resets the count obtained by the count unit when the drawing process execution unit executes the drawing command.

9 Claims, 7 Drawing Sheets

IMAGE FORMING APPARATUS CAPABLE OF SPEEDING UP DRAWING PROCESS, AN IMAGE FORMING METHOD, AND A NON-TRANSITORY COMPUTER-READABLE RECORDING MEDIUM

INCORPORATION BY REFERENCE

This application is based on, and claims priority to corresponding Japanese Patent Application No. 2014-069018, filed in the Japan Patent Office on Mar. 28, 2014, the entire contents of which are incorporated herein by reference.

FIELD

Unless otherwise indicated herein, the description in this field section and the background section is not prior art to the claims in this application and is not admitted to be prior art by inclusion in this section. The present disclosure relates to an image forming apparatus, an image forming method, and a non-transitory computer-readable recording medium.

BACKGROUND

A typical data processing device including a printer driver controls the printer driver to convert print data received from an application into page description language (PDL) data and transmit the PDL data to an image forming apparatus. In the conversion into the PDL data, a text object (character code), a vector object (graphic form or line), or a raster object (image) is converted into an object of the same format in principle.

Further, a typical data processing device extracts an image element from the data for printing and converts the extracted image element into the PDL data based on a page description language when a print shape formed of a combination of image elements is a broken line.

Such a technology results in the converted PDL data having a smaller size than the size of the application print data. However, the above-described technology does nothing to speed-up the drawing process when the PDL data converted by the data processing device is transmitted to the image forming apparatus or when the PDL data is subjected to the drawing process by the image forming apparatus.

SUMMARY

The present disclosure relates to an image forming apparatus capable of speeding up a drawing process, an image forming method, and a non-transitory computer-readable recording medium.

The image forming apparatus according to one embodiment of the present disclosure includes a count unit, a count determination unit, a drawing process execution unit, and a count resetting unit.

The count unit counts a drawing command for a vector object.

The count determination unit determines whether the count of the drawing commands obtained by the count unit is equal to or larger than a threshold value.

The drawing process execution unit executes, when the count determination unit determines that the count is equal to or larger than the threshold value, all the drawing commands for the vector objects counted by the count unit prior to the count being equal to or larger than the threshold value.

The count resetting unit resets the count obtained by the count unit when the drawing process execution unit executes the drawing command.

Additional features and advantages are described herein, and will be apparent from the following Detailed Description and the figures.

BRIEF DESCRIPTION OF FIGURES

All drawings are intended to illustrate aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming commands as at least one unit of carrying out one or more of the functions described herein.

First Embodiment

Figure 1:
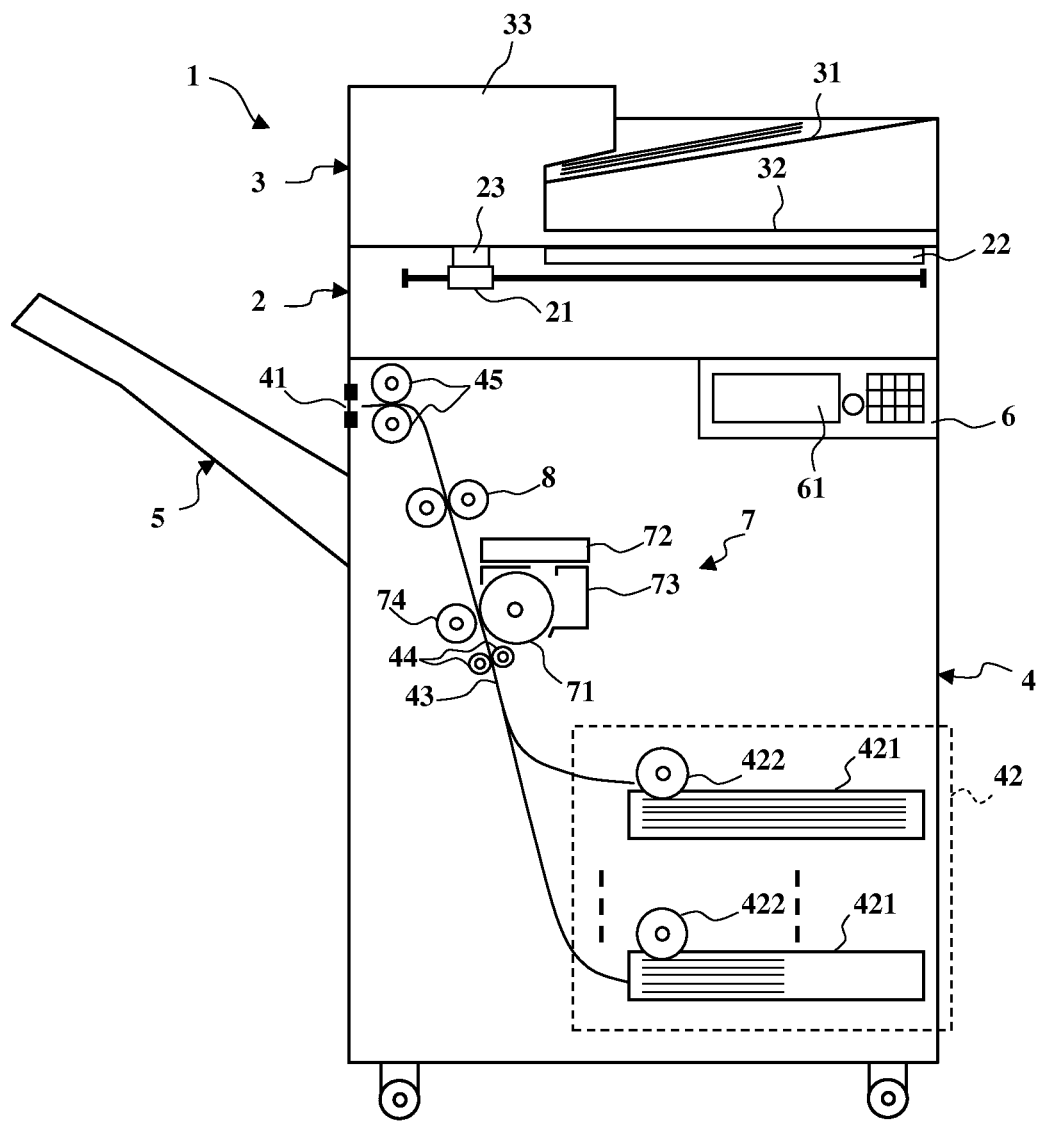
FIG. 1 is a schematic diagram illustrating a configuration of an image forming apparatus according to a first embodiment or a second embodiment of the present disclosure.

FIG. 1 is a schematic diagram illustrating a configuration of an image forming apparatus 1 according to a first embodiment of the present disclosure.

The image forming apparatus 1 according to this embodiment includes a manuscript reading unit 2, a manuscript feeding unit 3, a main body unit 4, a stack tray 5, and an operation panel unit 6 (input unit).

The manuscript reading unit 2 may be located above the main body unit 4, and the manuscript feeding unit 3 may be located above the manuscript reading unit 2. The stack tray 5 may be located on a side of an outlet 41 for recording paper mounted to the main body unit 4, and the operation panel unit 6 may be located on a front side of the main body unit 4.

The manuscript reading unit 2 includes a scanner 21, a platen glass plate 22, and a manuscript reading slit 23. The scanner 21 includes an exposure lamp and a charge coupled device (CCD) or complementary metal oxide semiconductor (CMOS) image pickup sensor, and is configured to be movable in a direction in which a manuscript is conveyed by the manuscript feeding unit 3. The platen glass plate 22 is a manuscript table formed of a transparent member such as glass. The manuscript reading slit 23 includes a slit formed in a direction orthogonal to the direction in which the manuscript is conveyed by the manuscript feeding unit 3.

Figure 2:
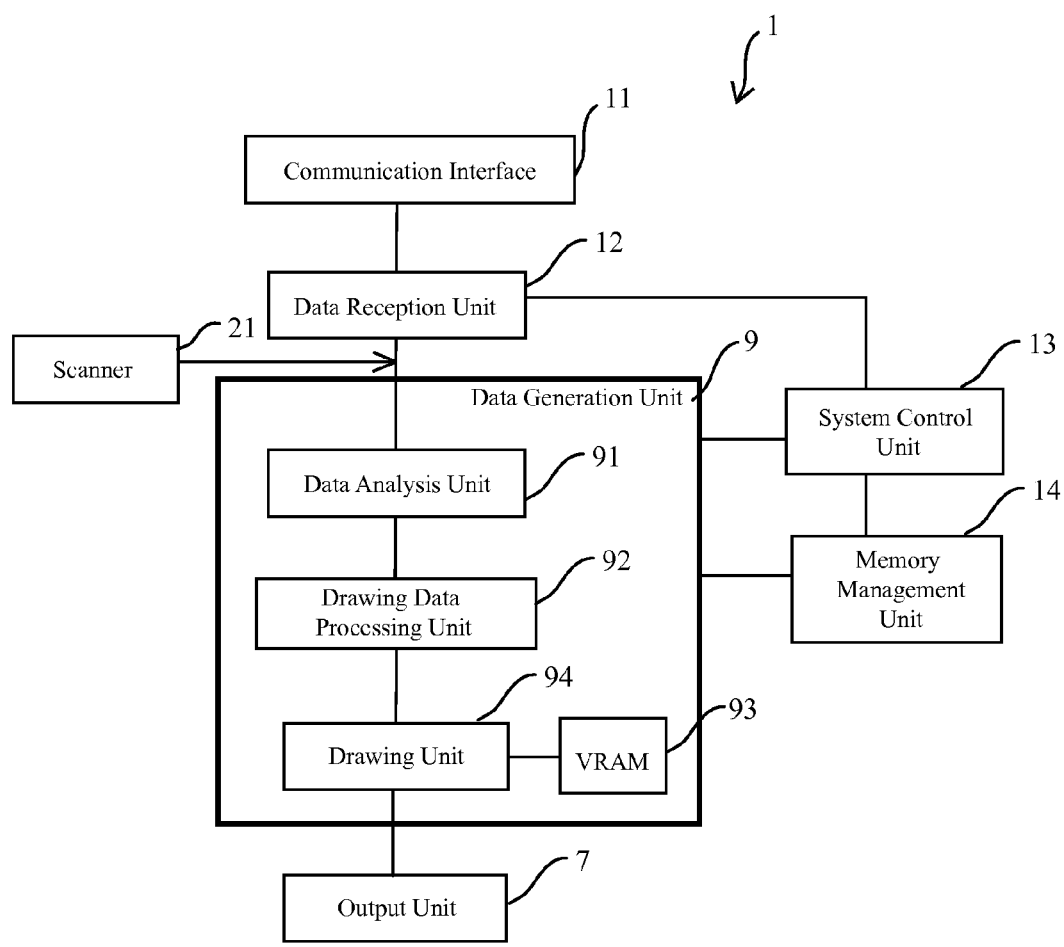
FIG. 2 is a schematic diagram illustrating a functional block configuration of the image forming apparatus according to the first embodiment or the second embodiment.

To read the manuscript placed on the platen glass plate 22, the scanner 21 is moved to a position opposed to the platen glass plate 22, reads the manuscript placed on the platen glass plate 22 while scanning the manuscript to acquire image data, and outputs the acquired image data to a data generation unit 9 illustrated in FIG. 2 included in a control circuit of the main body unit 4.

Further, to read the manuscript conveyed by the manuscript feeding unit 3, the scanner 21 is moved to a position opposed to the manuscript reading slit 23, reads the manuscript via the manuscript reading slit 23 in synchronization with a conveying operation conducted for the manuscript by the manuscript feeding unit 3 to acquire image data, and outputs the acquired image data to the data generation unit 9 illustrated in FIG. 2 included in the control circuit of the main body unit 4. Note that, the image data acquired by the scanner 21 can also be stored in a peripheral device such as a PC and then input to the data generation unit 9 via a communication interface 11 and a data reception unit 12.

The manuscript feeding unit 3 includes a manuscript placement unit 31, a manuscript delivery unit 32, and a manuscript conveying mechanism 33. The manuscripts placed on the manuscript placement unit 31 are successively drawn out by the manuscript conveying mechanism 33 sheet by sheet to be conveyed to a position opposed to the manuscript reading slit 23 and then delivered onto the manuscript delivery unit 32. Note that, the manuscript feeding unit 3 is configured to be tiltable, and by lifting the manuscript feeding unit 3 upward, it is possible to expose an upper surface of the platen glass plate 22.

The main body unit 4 includes an output unit 7, a sheet feeding unit 42, a sheet conveying path 43, a conveying roller pair 44, and a delivery roller pair 45. The sheet feeding unit 42 includes a plurality of sheet feeding cassettes 421 in which recording paper having mutually different sizes or orientations is received and a sheet feeding roller 422 that draws out the recording paper from each sheet feeding cassette 421 sheet by sheet to the sheet conveying path 43.

The sheet feeding roller 422, the conveying roller pair 44, and the delivery roller pair 45 function as a conveying unit. The recording paper is conveyed by the conveying unit. The recording paper drawn out to the sheet conveying path 43 by the sheet feeding roller 422 is conveyed to the output unit 7 by the conveying roller pair 44.

Then, the recording paper subjected to the recording by the output unit 7 is delivered to the stack tray 5 by the delivery roller pair 45.

The operation panel unit 6 includes a display panel 61 such as an LCD and the input unit including a start key, a numeric keypad, a switching button between operation modes of copy, FAX transmission, scan, and the like, and buttons or a touch panel used to issue an command on printing, transmission, reception, saving, or recording. In other words, the operation panel unit 6 receives an input of commands for those kinds of job issued to the image forming apparatus 1 by a user.

Further, the operation panel unit 6 receives an input of authentication information such as a password from the user.

The output unit 7 includes a photosensitive drum 71, an exposure unit 72, a developing unit 73, a transfer unit 74, and a fixing device 8. The exposure unit 72 may be an optical unit including a laser device, a mirror, and a lens, and outputs a beam based on the image data to expose the photosensitive drum 71 thereto, to thereby form an electrostatic latent image on a front surface of the photosensitive drum 71. The developing unit 73 develops the electrostatic latent image formed on the photosensitive drum 71 by using toner, and forms a toner image based on the electrostatic latent image on the photosensitive drum 71.

The transfer unit 74 transfers the toner image formed on the photosensitive drum 71 by the developing unit 73 onto the recording paper. The fixing device 8 heats the recording paper onto which the toner image has been transferred by the transfer unit 74, to thereby fix the toner image to the recording paper.

FIG. 2 is a schematic diagram illustrating a functional block configuration of the image forming apparatus 1. The image forming apparatus 1 includes the data reception unit 12 that receives PDL data from a data processing device such as a host computer via the communication interface 11, the data generation unit 9 that generates data for drawing based on the PDL data received by the data reception unit 12 or the data input from the scanner 21, the output unit 7 that prints the data generated by the data generation unit 9 on the recording paper as described above, a system control unit 13 that controls a system by managing shared information on the system, and a memory management unit 14 that manages a memory used by the system.

The data generation unit 9 includes a data analysis unit 91 that analyzes the PDL data received by the data reception unit 12, a drawing data processing unit 92 that processes drawing data in accordance with a command issued from the data analysis unit 91, and a drawing unit 94 that generates a bitmap in a VRAM 93 from a display list generated by the drawing data processing unit 92.

Figure 3:
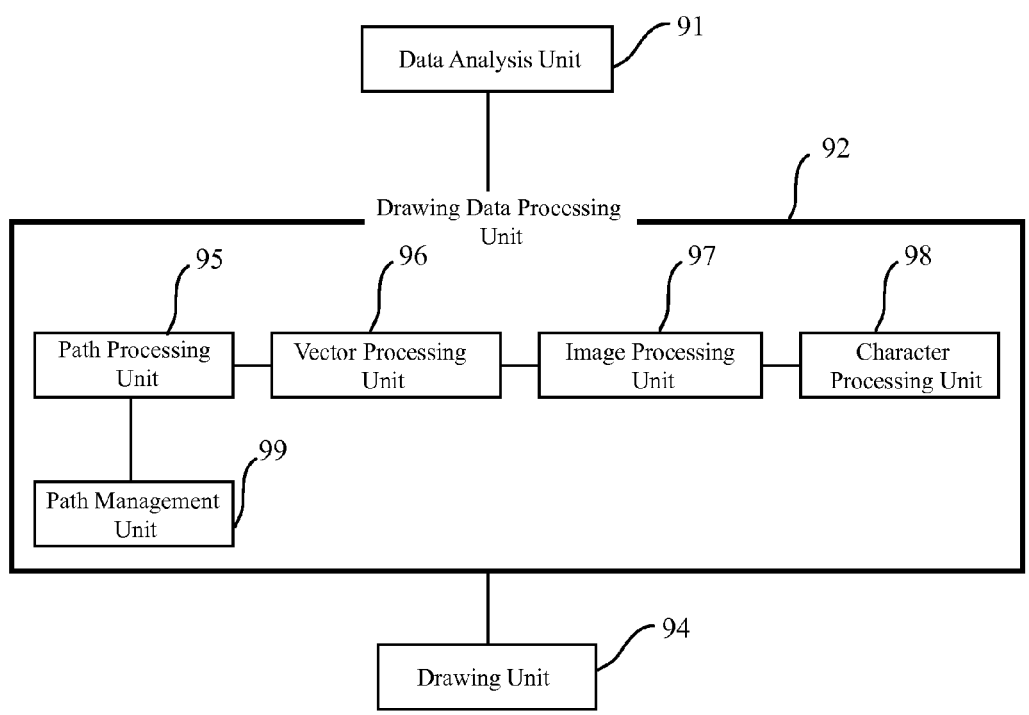
FIG. 3 is a schematic diagram illustrating a functional block configuration of a drawing data processing unit of the image forming apparatus according to the first embodiment or the second embodiment.

The data analysis unit 91 interprets a command included in the PDL data, and in accordance with a type of the interpreted command, transmits the command to each of processing units 95 to 98 illustrated in FIG. 3 included in the drawing data processing unit 92. Further, the data analysis unit 91 transmits path information on an interpreted drawing command (vector drawing) for a vector object to the path processing unit 95. Further, when the analyzed data includes a page delivery command, the data analysis unit 91 also transmits the command to the vector processing unit 96 illustrated in FIG. 3 included in the drawing data processing unit 92.

FIG. 3 is a schematic diagram illustrating a functional block configuration of the drawing data processing unit 92 of the image forming apparatus 1. The drawing data processing unit 92 includes, as illustrated in FIG. 3, the path processing unit 95 that processes the path information on the vector drawing, the vector processing unit 96 that generates the display list of the vector drawing, the image processing unit 97 that generates the display list in accordance with an image drawing command, the character processing unit 98 that generates the display list in accordance with a character drawing command, and the path management unit 99 that manages the path information processed by the path processing unit 95.

The path processing unit 95 serves to process information including a coordinate position of the vector drawing such as a line or a polygon included in the path information. The vector processing unit 96 generates the display list by subjecting the vector object to a drawing process in accordance with a vector drawing command. The image processing unit 97 generates the display list by processing an image in accordance with the image drawing command. The character processing unit 98 generates the display list by processing a text object in accordance with the character drawing command.

Figure 4:
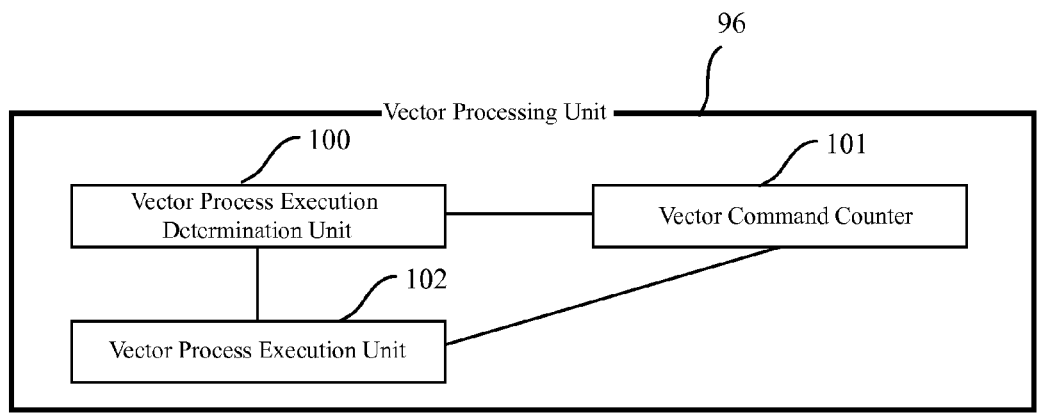
FIG. 4 is a schematic diagram illustrating a functional block configuration of a vector processing unit of the image forming apparatus according to the first embodiment.

FIG. 4 is a schematic diagram illustrating a functional block configuration of the vector processing unit of the image forming apparatus according to the first embodiment. The vector processing unit 96 includes, as illustrated in FIG. 4, a vector process execution determination unit 100 that determines whether or not to execute the vector process, a vector command counter 101 that counts the vector drawing command, and a vector process execution unit 102 that generates the display list by subjecting the vector object to the drawing process.

The vector process execution determination unit 100 adds "1" to a value of the vector command counter 101 each time the drawing command for the vector object is transmitted. Further, the vector process execution determination unit 100 determines whether or not the value of the vector command counter is equal to or larger than a threshold value determined in advance, and when the value is equal to or larger than the threshold value, transmits the vector drawing command to the vector process execution unit 102. The threshold value determined by the vector process execution determination unit 100 is a threshold value indicating how many vector commands need to be accumulated before the vector process therefor is collectively executed in actuality, and can be determined in advance by the user. Further, when the page delivery command is transmitted from the data analysis unit, the vector process execution determination unit 100 determines whether or not the value of the vector command counter 101 is equal to or larger than 1, and when the value is equal to or larger than 1, the vector drawing command is transmitted to the vector process execution unit 102.

When the vector drawing command is transmitted from the vector process execution determination unit 100, the vector process execution unit 102 executes the drawing process for the vector object based on the path information managed by the path management unit 99. Further, after executing the drawing process for the vector object, the vector process execution unit 102 resets the value of the vector command counter 101.

Figure 5:
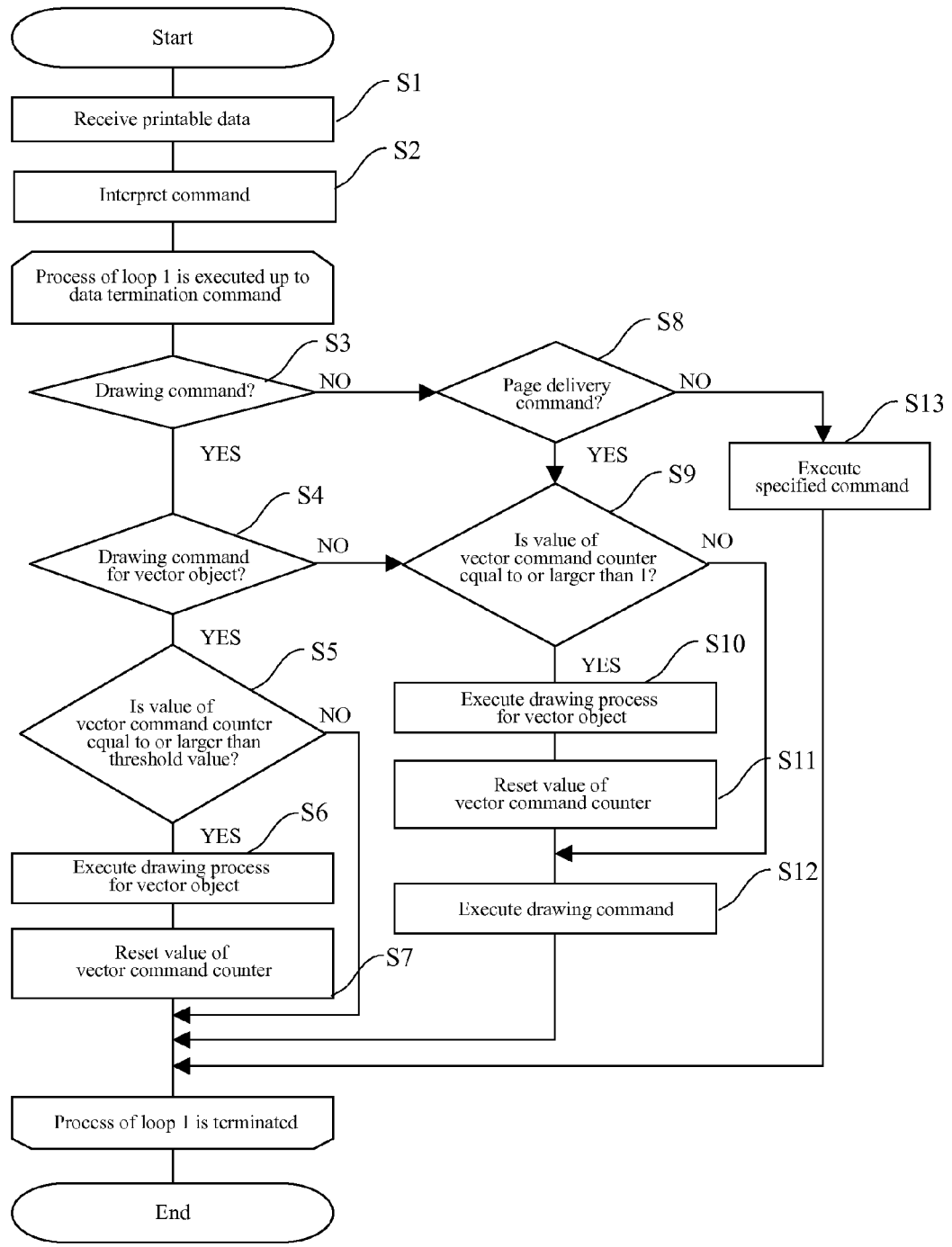
FIG. 5 is a flowchart of a vector drawing process executed by the image forming apparatus according to the first embodiment.

FIG. 5 is a flowchart of a vector drawing process executed by the image forming apparatus 1 according to the first embodiment.

The image forming apparatus 1 receives printable data input via the communication interface 11 by the data reception unit 12 (Step S1). The image forming apparatus 1 interprets a command described in PDL in the printable data by the data analysis unit 91 (Step S2). When the command within the PDL data is interpreted in Step S2, a process of loop 1 from Step S3 to Step S13 is repeatedly executed for each command. When the process of loop 1 is executed up to a data termination command, the vector drawing process is brought to an end.

In the process of loop 1, the data analysis unit 91 determines whether or not the command interpreted in Step S2 is the drawing command (Step S3). When the command is the drawing command, "YES" is determined in Step S3, and hence the data analysis unit 91 determines whether or not the command interpreted in Step S2 is the drawing command for the vector object (Step S4).

When "YES" is determined in Step S4, the data analysis unit 91 transmits the drawing command for the vector object to the drawing data processing unit 92, and a process for the drawing command is executed by the vector processing unit 96. In the vector processing unit 96, the vector process execution determination unit 100 adds "1" to the value of the vector command counter 101 each time the drawing command for the vector object is transmitted, and further determines whether or not the value of the vector command counter 101 is equal to or larger than the threshold value determined in advance (Step S5). When "YES" is determined, the vector process execution unit 102 executes the drawing process for the vector object (Step S6), and resets the value of the vector command counter 101 (Step S7).

When "NO" is determined in Step S3, the data analysis unit 91 determines whether or not the command interpreted in Step S2 is the page delivery command (Step S8). When "NO" is determined in Step S4 or when "YES" is determined in Step S8, in other words, when the command interpreted in Step S2 is a drawing command for a process different from the vector drawing or the page delivery command, the vector process execution determination unit 100 determines whether or not the value of the vector command counter 101 is equal to or larger than 1 (Step S9). When "YES" is determined in Step S9, the vector process execution unit 102 executes the drawing process for the vector object (Step S10), and resets the value of the vector command counter 101 (Step S11).

After the process of Step S11 is executed or when "NO" is determined in Step S9, in accordance with the command interpreted in Step S2, the drawing command is executed by the processing unit such as the image processing unit 97 or the character processing unit 98 within the drawing data processing unit 92 (Step S12). Further, when "NO" is determined in Step S8, the specified command (command interpreted in Step S2) is executed (Step S13).

According to the first embodiment, the drawing commands for vector objects the number of which is equal to or larger than a threshold value are collectively executed, which can speed-up a process for print data that uses a large number of vector commands continuously.

Further, according to the first embodiment, the drawing commands for the vector objects are collectively executed when the command for a process different from the vector drawing is received, which can speed-up the process for the print data that uses a large number of vector commands continuously.

Second Embodiment

Figure 6:
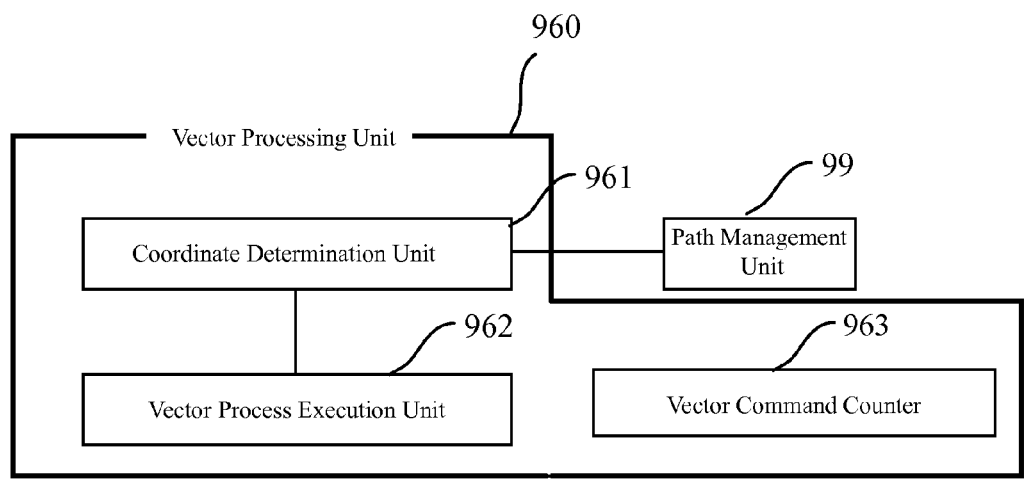
FIG. 6 is a schematic diagram illustrating a functional block configuration of a vector processing unit of the image forming apparatus according to the second embodiment.

FIG. 6 is a schematic diagram illustrating a functional block configuration of a vector processing unit of the image forming apparatus according to the second embodiment.

In the above-described first embodiment, the drawing process for the vector object is executed when a counter of the drawing command for the vector object has a value equal to or larger than the threshold value, while in the second embodiment, a vector processing unit 960 illustrated in FIG. 6 is provided in place of the vector processing unit 96 of the first embodiment.

The vector processing unit 960 includes: a coordinate determination unit 961 that determines whether or not an x-coordinate or a y-coordinate of a path specified in each of successive drawing commands for vector objects is the same; and a vector process execution unit 962 that executes the drawing commands for vector objects determined to have the same coordinate by the coordinate determination unit 961 when there is a drawing command for a vector object in which a path having a different coordinate from the coordinate that has been determined to be the same by the coordinate determination unit 961 is specified. The coordinate determination unit 961 determines the coordinate specified in the drawing command based on the path information managed by the path management unit 99.

Figure 7:
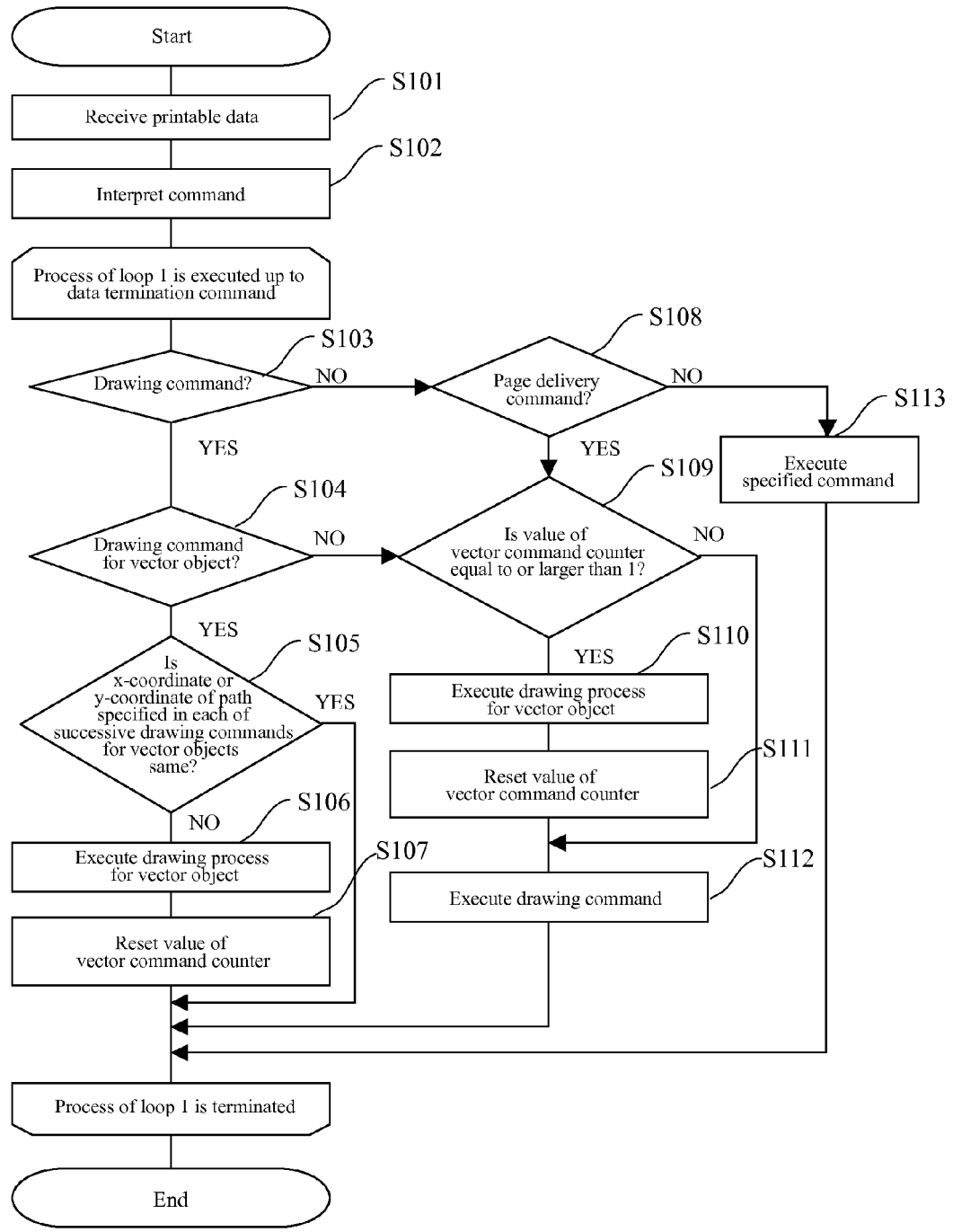
FIG. 7 is a flowchart of the vector drawing process executed by the image forming apparatus according to the second embodiment.

Now, a description is made of the vector drawing process executed in this embodiment. FIG. 7 is a flowchart illustrating the vector drawing process executed by the image forming apparatus according to the second embodiment.

In this process, in the same manner as the process of FIG. 5, the image forming apparatus 1 receives the PDL data by the data reception unit 12 (Step S101), then interprets the command within the PDL data by the data analysis unit 91 (Step S102), and repeatedly executes the process of loop 1 from Step S103 to Step S113 each time the command is interpreted until the data termination command is executed.

In the process of loop 1, the data analysis unit 91 determines whether or not the command interpreted in Step S102 is the drawing command (Step S103). When "YES" is determined in Step S103, the data analysis unit 91 determines whether or not the command interpreted in Step S102 is the drawing command for the vector object (Step S104).

When "YES" is determined in Step S104, in the vector processing unit 960, the coordinate determination unit 961 adds "1" to a value of a vector command counter 963 each time the drawing command for the vector object is transmitted, and further determines whether or not the x-coordinate or the y-coordinate of the path specified in each of the successive drawing commands for the vector objects is the same (Step S105). When "NO" is determined, the vector process execution unit 962 executes the drawing process for the vector object (Step S106), and resets the value of the vector command counter 963 (Step S107).

When "NO" is determined in Step S103, the data analysis unit 91 determines whether or not the command interpreted in Step S102 is the page delivery command (Step S108). When "NO" is determined in Step S104 or when "YES" is determined in Step S108, the coordinate determination unit 961 determines whether or not the value of the vector command counter 963 is equal to or larger than 1 (Step S109). When "YES" is determined in Step S109, the vector process execution unit 962 executes the drawing process for the vector object (Step S110), and resets the value of the vector command counter 963 (Step S111).

After the process of Step S111 is executed or when "NO" is determined in Step S109, in accordance with the command interpreted in Step S102, the drawing command is executed by the processing unit such as the image processing unit 97 or the character processing unit 98 within the drawing data processing unit 92 (Step S112). Further, when "NO" is determined in Step S108, the specified command (command interpreted in Step S102) is executed (Step S113).

According to this embodiment, for example, when there is a change in the y-coordinate of the path specified in the drawing command for the vector object, the drawing commands for the vector objects involving the paths having the same y-coordinate before the change are executed. Therefore, in a case where horizontal line segments of a broken line are drawn with each solid line part of the broken line drawn by vector commands independent of one another, the horizontal line segments of the broken line can be collectively drawn. Further, when there is a change in the x-coordinate of the path specified in the drawing command for the vector object, the drawing commands for the vector objects involving the paths having the same x-coordinate before the change are executed. Therefore, in a case where vertical line segments of a broken line are drawn with each solid line part of the broken line drawn by vector commands independent of one another, the vertical line segments of the broken line can be collectively drawn.

According to the second embodiment, the drawing commands for vector objects involving the successive paths having the same x-coordinate or y-coordinate are collectively executed, which can speed-up the process for the print data that uses a large number of vector commands continuously to draw horizontal line segments or vertical line segments.

Note that, the vector process execution unit 962 may be configured to execute the drawing commands for vector objects determined to have the same coordinate by the coordinate determination unit 961 when the command for a process different from the vector drawing is received.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising a control circuit, the control circuit comprising:
    a count unit as a first control circuit that counts how many drawing commands for a vector object are received in incoming printable data;
    a count determination unit as a second control circuit that determines whether or not a count of the drawing commands determined by the count unit is equal to or larger than a threshold value;
    a drawing process execution unit as a third control circuit that executes, when the count determination unit determines that the count is equal to or larger than the threshold value, all the drawing commands for the vector objects counted by the count unit prior to the count being equal to or larger than the threshold value; and
    a count resetting unit as a fourth control circuit that resets the count determined by the count unit when the drawing process execution unit executes the drawing command,
    wherein the drawing process execution unit executes, when a command different from the drawing command for the vector object is received, all the drawing commands for the vector objects counted by the count unit before the different command is received.

2. The image forming apparatus according to claim 1, wherein the incoming printable data is page description language (PDL) data describing one or more of a text object, a vector object, or a raster object.

3. The image forming apparatus according to claim 1, wherein the incoming printable data is page description language (PDL) data describing one or more of a text object, a vector object, or a raster object, and wherein the command different from the drawing command for the vector object is one of a command for a text object or a command for a raster object.

4. An image forming method, comprising:
counting a drawing command for a vector object, wherein the drawing command is one of a plurality of commands received in incoming printable data;
determining whether or not a count of the drawing commands for the vector objects is equal to or larger than a threshold value;
executing, when the count is determined to be equal to or larger than the threshold value, all the drawing commands for the vector objects counted prior to the count being equal to or larger than the threshold value;
resetting the count when the drawing command is executed; and
executing, when a command different from the drawing command for the vector object is received, all the drawing commands for the vector objects counted before the different command is received.

5. The image forming method according to claim 4, wherein the incoming printable data is page description language (PDL) data describing one or more of a text object, a vector object, or a raster object.

6. The image forming method according to claim 4, wherein the incoming printable data is page description language (PDL) data describing one or more of a text object, a vector object, or a raster object, and wherein the command different from the drawing command for the vector object is one of a command for a text object or a command for a raster object.

7. A non-transitory computer-readable recording medium having a program recorded thereon, the program causing a computer to function as:
a count unit that counts a drawing command for a vector object, wherein the drawing command is one of a plurality of commands received in incoming printable data;
a count determination unit that determines whether or not a count of the drawing commands obtained by the count unit is equal to or larger than a threshold value;
a drawing process execution unit that executes, when the count determination unit determines that the count is equal to or larger than the threshold value all the drawing commands for the vector objects counted by the count unit prior to the count being equal to or larger than the threshold value; and
a count resetting unit that resets the count obtained by the count unit when the drawing process execution unit executes the drawing command,
wherein the drawing process execution unit executes, when a command different from the drawing command for the vector object is received, all the drawing commands for the vector objects counted before the different command is received.

8. The non-transitory computer-readable recording medium according to claim 7, wherein the incoming printable data is page description language (PDL) data describing one or more of a text object, a vector object, or a raster object.

9. The non-transitory computer-readable recording medium according to claim 7, wherein the incoming printable data is page description language (PDL) data describing one or more of a text object, a vector object, or a raster object, and wherein the command different from the drawing command for the vector object is one of a command for a text object or a command for a raster object.

* * * * *